(12) United States Patent
Prodaniuk

(10) Patent No.: US 9,109,376 B2
(45) Date of Patent: Aug. 18, 2015

(54) APPARATUS AND SYSTEM FOR FORMING A STRUCTURE

(71) Applicant: Gary Robert Prodaniuk, Redwater (CA)

(72) Inventor: Gary Robert Prodaniuk, Redwater (CA)

(*) Notice: Subject to any disclaimer, the term of this patent is extended or adjusted under 35 U.S.C. 154(b) by 0 days.

(21) Appl. No.: 13/887,105

(22) Filed: May 3, 2013

(65) Prior Publication Data

US 2014/0325931 A1    Nov. 6, 2014

(51) Int. Cl.
*E04H 1/12* (2006.01)
*F16B 5/06* (2006.01)

(52) U.S. Cl.
CPC .. *E04H 1/12* (2013.01); *F16B 5/06* (2013.01); *Y10T 403/595* (2015.01)

(58) Field of Classification Search
CPC ..... E04B 1/344; E04B 1/3441; E04B 1/3442; E04B 1/3444; E04B 1/34315; E04B 1/34321; E04B 1/34326; E04B 1/34331
USPC .............................. 52/656.9, 79.9, 79.5, 79.12
See application file for complete search history.

(56) References Cited

U.S. PATENT DOCUMENTS

| | | | | |
|---|---|---|---|---|
| 2,666,507 A * | 1/1954 | Ruark | .............................. | 52/643 |
| 2,693,195 A * | 11/1954 | Frieder et al. | .................. | 135/122 |
| 3,593,387 A * | 7/1971 | Georgi | ............................. | 410/82 |
| 3,612,466 A * | 10/1971 | Arnold | ............................. | 410/83 |
| 3,856,247 A * | 12/1974 | Keighley | ........................ | 410/77 |
| 3,872,634 A * | 3/1975 | Seaman | ........................... | 52/222 |
| 3,946,532 A * | 3/1976 | Gilb | ................................. | 52/692 |
| 4,003,179 A * | 1/1977 | Gilb | ................................. | 52/696 |
| 4,026,596 A * | 5/1977 | Carr | ................................. | 410/82 |
| 4,062,167 A * | 12/1977 | Gilb | ................................. | 52/693 |
| 4,069,635 A * | 1/1978 | Gilb | ................................. | 52/693 |
| 4,108,326 A * | 8/1978 | Bertolini | ........................ | 220/1.5 |
| 4,537,540 A * | 8/1985 | Boughton | ........................ | 410/82 |
| 4,545,171 A * | 10/1985 | Colvin | ........................... | 52/79.5 |
| 4,546,591 A * | 10/1985 | Beltz | ................................ | 52/645 |
| 4,660,332 A * | 4/1987 | Colvin, Jr. | .................... | 52/79.5 |
| 4,697,967 A * | 10/1987 | Schulz et al. | .................. | 410/82 |
| 4,828,308 A * | 5/1989 | Riedl | ......................... | 294/81.53 |
| 4,854,094 A * | 8/1989 | Clark | ............................ | 52/79.1 |
| 4,891,919 A * | 1/1990 | Palibroda | ....................... | 52/79.5 |
| 5,267,819 A * | 12/1993 | Lycett | ............................. | 104/82 |
| 5,335,469 A * | 8/1994 | Stuart | ........................... | 52/655.1 |
| 5,447,000 A * | 9/1995 | Larsen | ........................... | 52/79.1 |
| 5,761,854 A * | 6/1998 | Johnson et al. | .................... | 52/69 |
| 5,765,977 A * | 6/1998 | Reynard | .......................... | 410/82 |
| 5,802,772 A * | 9/1998 | Burke et al. | ......................... | 52/6 |
| 5,950,373 A * | 9/1999 | von Hoff et al. | ................ | 52/79.5 |
| 5,966,956 A * | 10/1999 | Morris et al. | ................. | 62/259.1 |
| 6,000,191 A * | 12/1999 | Kessler | ...................... | 52/745.15 |

(Continued)

FOREIGN PATENT DOCUMENTS

| | | |
|---|---|---|
| AU | 2010212272 | 3/2012 |
| CN | 201785871 | 4/2011 |

*Primary Examiner* — James Ference
(74) *Attorney, Agent, or Firm* — Richard D. Okimaw

(57) ABSTRACT

A system for forming a structure around a shipping container includes a plurality of uprights positioned on the ground at a distance from the side of the shipping container and a plurality of trusses. Each truss has top and bottom members extending between proximate and distal ends. The proximate end of each of the top and bottom members has a bore therethrough engageable by a pin connection supported by the shipping container. The distal ends of the top and bottom members are engageable with and supported by one of the uprights.

9 Claims, 10 Drawing Sheets

(56) References Cited

U.S. PATENT DOCUMENTS

| | | | |
|---|---|---|---|
| 6,077,006 A * | 6/2000 | Nelson | 410/82 |
| 6,463,705 B1 * | 10/2002 | Davis et al. | 52/143 |
| 6,712,414 B2 * | 3/2004 | Morrow | 296/26.01 |
| 6,772,563 B2 * | 8/2004 | Kuhn | 52/67 |
| 7,310,914 B1 * | 12/2007 | Moore | 52/92.2 |
| 7,823,337 B2 * | 11/2010 | Pope | 52/67 |
| 7,882,659 B2 * | 2/2011 | Gyory et al. | 52/79.5 |
| 7,895,794 B2 * | 3/2011 | Pope | 52/67 |
| 7,930,857 B2 * | 4/2011 | Pope | 52/67 |
| 8,112,943 B2 * | 2/2012 | Medley et al. | 52/79.5 |
| 8,151,537 B2 * | 4/2012 | Pope | 52/745.02 |
| 8,186,110 B2 * | 5/2012 | Green | 52/79.9 |
| 2003/0009954 A1 * | 1/2003 | Bradley | 52/79.1 |
| 2007/0074463 A1 * | 4/2007 | Ziegelman | 52/79.1 |
| 2007/0163184 A1 * | 7/2007 | Olesch | 52/79.5 |
| 2007/0271857 A1 * | 11/2007 | Heather et al. | 52/79.9 |
| 2009/0000213 A1 * | 1/2009 | Coopman | 52/79.5 |
| 2010/0018131 A1 * | 1/2010 | Green | 52/79.5 |
| 2010/0064599 A1 * | 3/2010 | Yang et al. | 52/79.5 |
| 2011/0259768 A1 * | 10/2011 | Campbell et al. | 206/216 |
| 2011/0297675 A1 * | 12/2011 | Johnson et al. | 220/8 |

* cited by examiner

APPARATUS AND SYSTEM FOR FORMING A STRUCTURE

BACKGROUND OF THE INVENTION

1. Field of Invention

The present invention relates to a frame structure for securely covering a container. In particular, the invention relates to a frame structure to create a building around a shipping container using a plurality of truss along with other supporting structures and coupling units.

2. Description of Related Art

Containers are commonly used for transporting materials from one location to another as cargo. These containers are commonly transported in ships and aircrafts. Once the materials or cargo are removed from a container at shore they may be used only once. Commonly such containers may be utilized as for storage at a location after or in replace of such transportation usage. Such storage containers provide secure and easily transportable storage. In other uses, some storage containers may be utilized as temporary or portable offices or facilities.

One disadvantage of such utilizing such storage containers is that they include a limited amount of space therein. Conventionally, if a user wishes to provide a greater amount of space, they must purchase and transport a greater quantity of containers or purchase a separate independent structure, such as a tent or the like. Disadvantageously, such additional structures will not commonly be sized to locate or integrate the container thereinto thereby creating a less efficient and less visually pleasing overall location.

SUMMARY OF THE INVENTION

The present invention discloses a system for forming a structure around a shipping container. The system includes a plurality of uprights positioned on the ground at a distance from the side of the shipping container. The system also includes a plurality of trusses. Each truss is having top and bottom members extending between proximate and distal ends. The proximate end of each of the top and bottom members have a bore therethrough engageable by a pin connection supported by the shipping container. The distal ends of the top and bottom members are engageable with and supported by one of the uprights.

The system may use multiple types of coupling units for holding the trusses on to top of the shipping container. The coupling units may be attached to the shipping container. The coupling units hold the portion of a top truss which is part of truss.

A coupling unit for securing a structural member to a shipping container includes a base plate, a number of flanges extending outwardly from the base plate to form at least one locking track, wherein the at least one locking track is capable of receiving the structural member. The coupling unit also has at least one locking member configured to engage with a lock receiver on an exterior surface of the shipping container.

The locking member includes an elongate screw member extending between top and bottom ends, the screw member being threadably passed through the base plate and a locking block fixedly connected to the bottom end of the screw member, the locking block being engageable within the lock receiver and selectably rotatable between engaged and disengaged positions therein. The locking member also includes a handle protruding from the top end of the screw member, wherein the handle is capable of being rotated to turn the screw member and the locking block into the engaged and disengaged positions. The locking member further includes at least one nut member threadably located around the screw member between the handle and the base plate being operable to rotatable lock of the screw member. The base plate of the coupling unit has an L-shaped cross-section.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
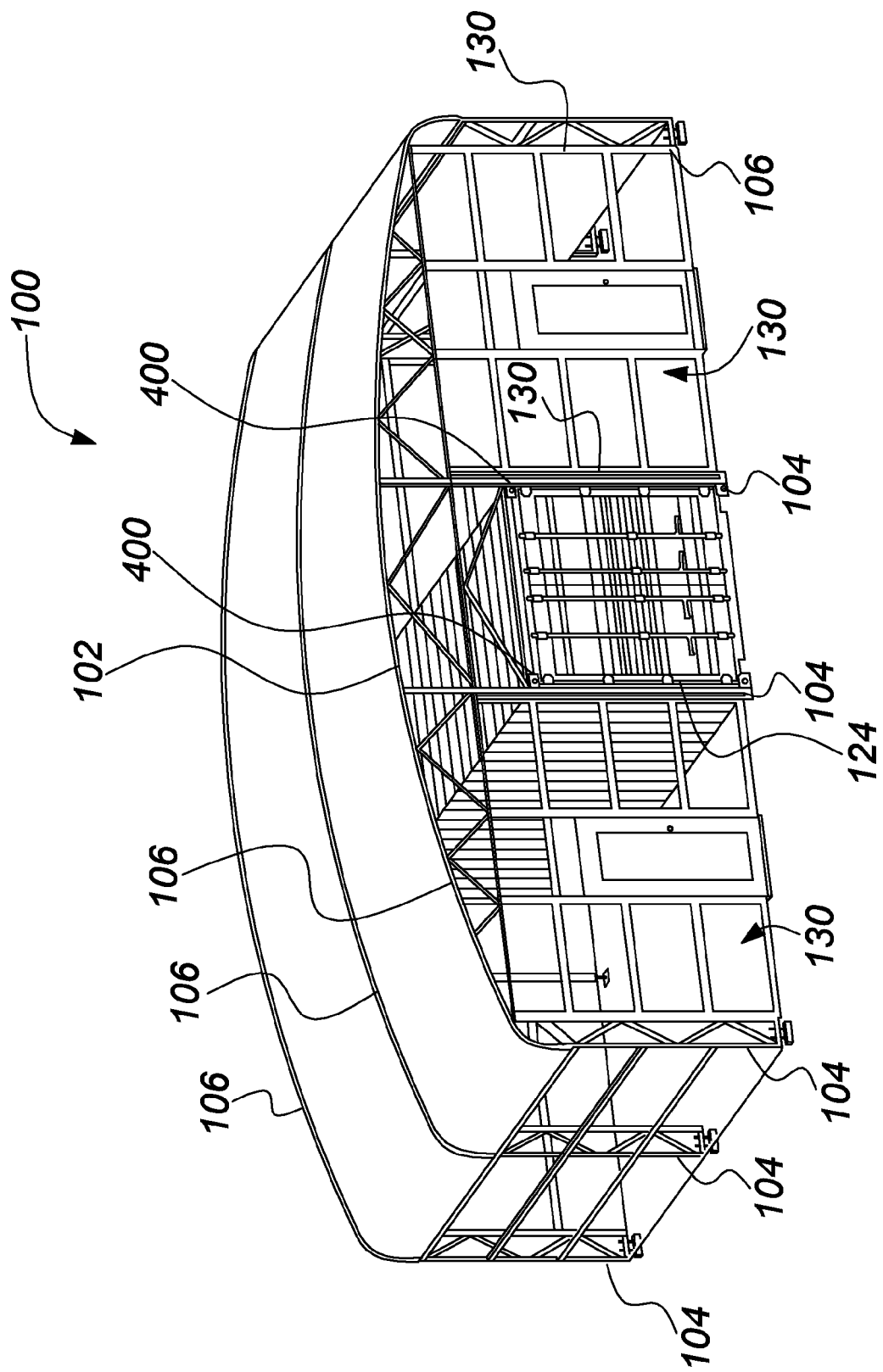
FIG. 1 is a perspective view of a system for forming a structure around a shipping container in accordance with a first embodiment of the present invention.

Referring to FIG. 1, a system for forming a structure around a shipping container 102 according to a first embodiment of the invention is shown generally at 100. The system 100 includes a plurality of uprights 104 positioned on the ground at a distance from the side of the shipping container 102. The system 100 also includes a plurality of trusses 106 extending over and secured to the top of the shipping container 102 and the uprights 104. As illustrated in FIG. 1, the system forms an enlarged structure around the shipping container so as to form additional enclosures adjacent to each side thereof. The plurality of trusses 106 are connected to the shipping container 102 by means of coupling units 400.

Figure 2:
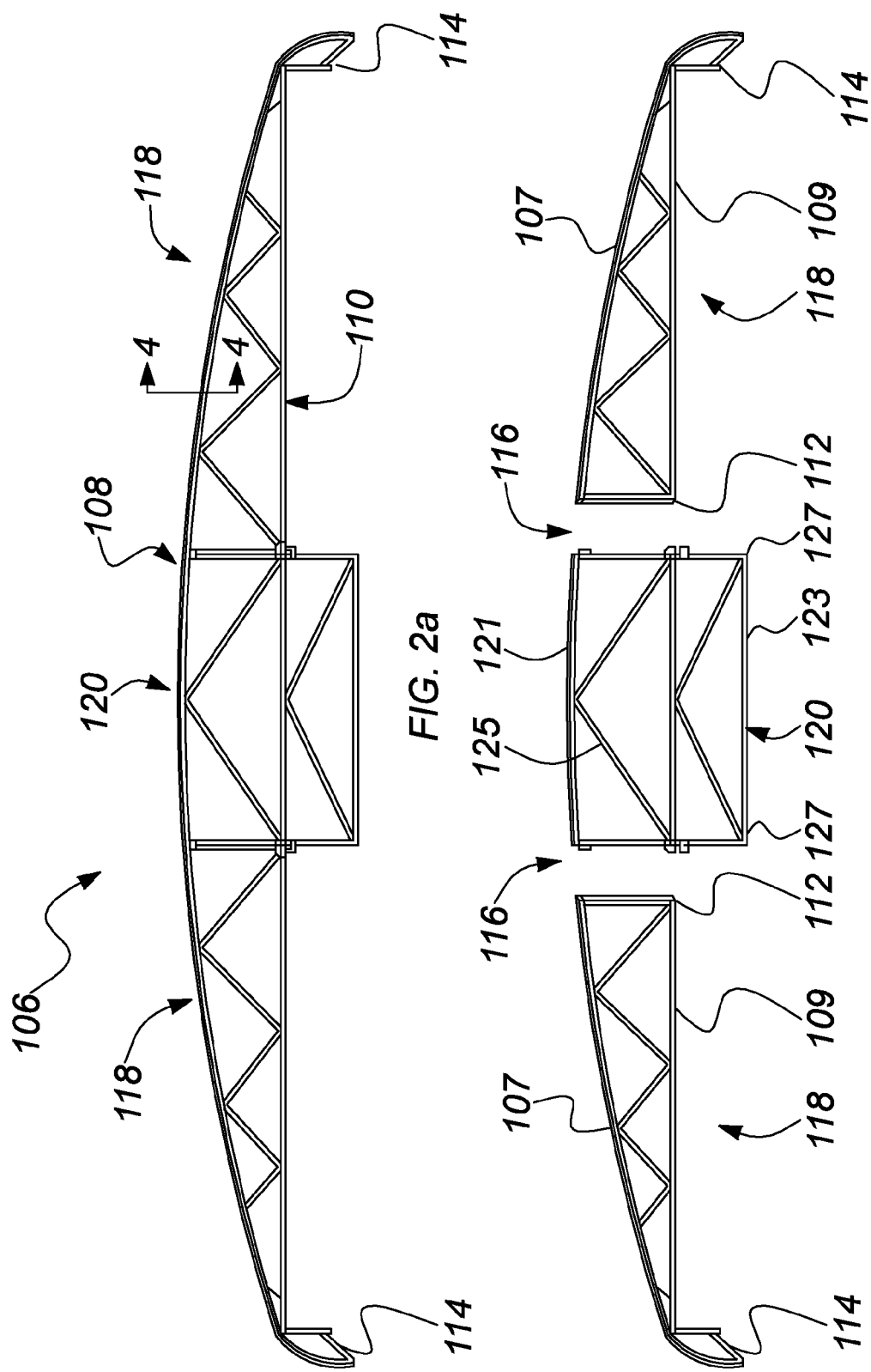
FIG. 2A is a perspective view of a truss for forming the system of FIG. 1.
FIG. 2B is an exploded perspective view of a truss for forming the system of FIG. 1.

With reference to FIGS. 2A and 2B, a perspective and exploded view of a truss 106 is illustrated. Each truss has a top 108 and bottom 110 edges extending between proximate 112 and distal 114 ends. Each truss 106 is formed of a center truss member 120 and a pair of end truss members 118 connected lengthwise thereto. The end truss members 118 are formed of top 107 and bottom 109 members extending between the proximate and distal ends 112 and 114 respectively with a plurality of cross braces 125 extending therebetween to form a space frame. The center truss member 120 is formed of a top member 121 and a bottom member 123 with a plurality of cross braces 125 extending therebetween to form a space frame. Each bottom member 123 of the center truss includes at least one bore 127 for passing a fastener (not shown in FIGS. 2A and 2B) for securing the top truss 120 to the top of the shipping container 102. The proximate ends 112 of each end truss member 118 are connected to the center truss member 120 proximate to the top and bottom edges 108 and 110 to align the top members 107 and 121 of the end and center truss members 118 and 120. In particular, the proximate ends 112 of each end truss member 118 are secured to the center truss member 120 by a bracket system 116 as will be more fully described below.

Figure 3:
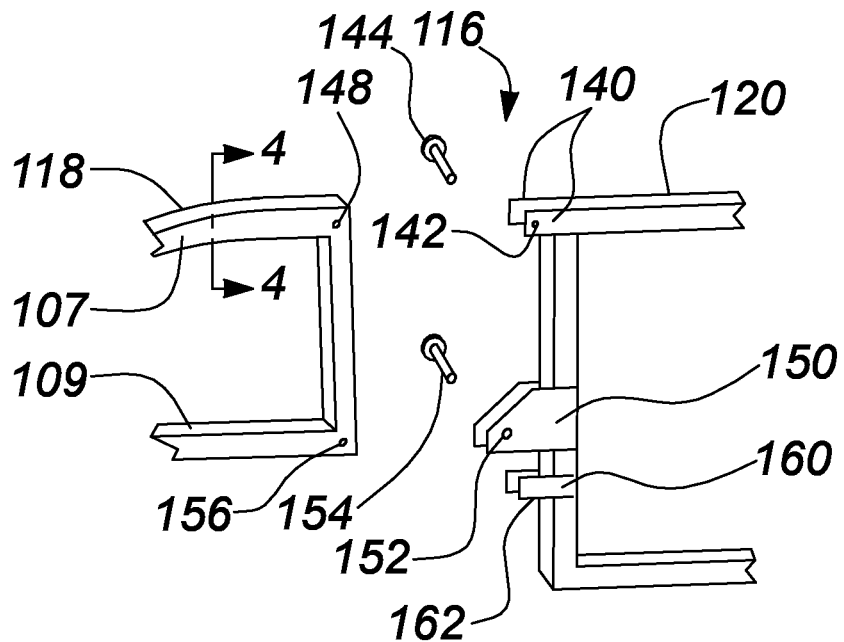
FIG. 3 is a detailed exploded perspective view of the brackets interconnecting the top and end trusses for forming the truss of FIG. 2.

With reference to FIG. 3, a detailed perspective view of the bracket system 116 is illustrated. The bracket system 116 comprises a pair of top bracket plates 140 extending from the top truss member 120 with a space therebetween. Each top bracket plate 140 includes a bore 142 therethrough sized to receive a fastener 144, such as, by way of non-limiting example, a pin, bolt or the like. The top member 107 of each end truss member 118 includes a top bore 148 corresponding to the bores 142 in the top bracket plates 142 so as to receive the fastener 146 therethrough. The bracket system 116 also comprises a pair of middle bracket plates 150 extending from the center truss member 120 with a space therebetween. Each middle bracket plate 150 includes a bore 152 therethrough sized to receive a fastener 154, such as, by way of non-limiting example, a pin, bolt or the like. The bottom member 109 of each end truss member 118 includes a bottom bore 156 corresponding to the bores 152 in the middle bracket plates 150 so as to receive the fastener 154 therethrough. It will be appreciated that the middle bracket plates 150 will be located at a position corresponding to the bottom member 109 of the end truss member 118. Furthermore, as illustrated in FIG. 3, the bracket system 116 may optionally include a pair of bottom bracket plates 160 extending from the center truss member 120 with a space therebetween at a position below the middle bracket plates 150. Each bottom bracket plate 160 includes a bore 162 therethrough sized to receive a fastener (not shown), such as, by way of non-limiting example, a pin, bolt or the like. The bottom bracket plates 160 may be utilized to secure a side wall 130 therein as illustrated in FIG. 1. Each of the top bracket plates 140, middle bracket plates 150 and bottom bracket plates are spaced apart by a distance corresponding to the width of the end truss member 118 or side wall 130 so as to receive the end truss or side wall 130 therebetween.

Figure 4:
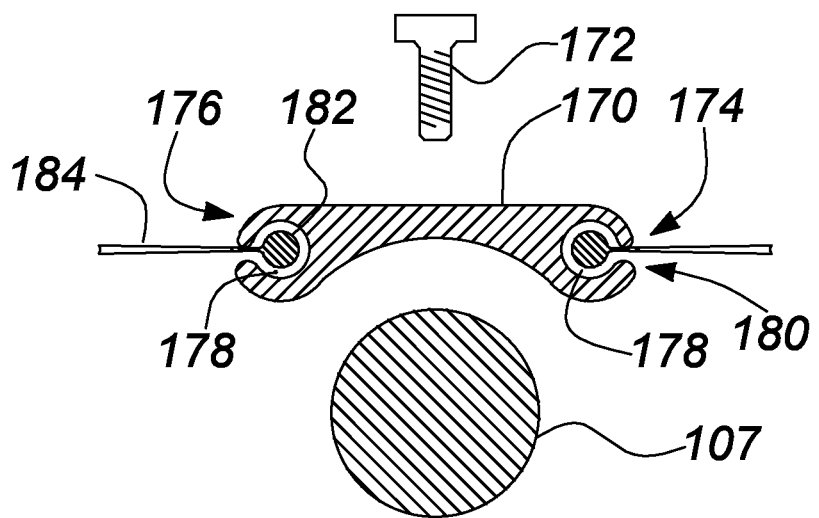
FIG. 4 is a cross sectional view of the upper truss member as taken along the line 4-4.

Turning now to FIG. 3, the top members 107 and 121 of the end truss and center truss members 120 each includes a track member 170 located thereon. The track member 170 comprises an elongate member which may be secured to the top member 107 by fasteners 172, such as bolts, rivets or the like by way of non-limiting example. The track member extends between first and second side edges, 174 and 176, respectively wherein each side edge includes a channel 178 running therealong having an opening 180 to an exterior of the track member. The channel 178 may be substantially circular as illustrated in FIG. 4, or any other cross-sectional shape as desired by a user. The channels 178 are selected to have a size sufficient to receive a beaded edge 182 of a fabric sheet 184 therein. By way of non-limiting example, such fabric sheets are commonly known, such as Keder Cord manufactured by Keder Solutions of Oak Creek Wis. The channel 178 provides a path of travel for the beaded edge 182 and permits the sheet to be pulled over the assembled structure between adjacent trusses as will be further described below so as to form a covered roof over the shipping container.

As illustrated in FIG. 1, the system 100 includes a plurality of uprights 104 positioned in a vertical orientation on the ground. Each upright 104 is positioned at sides of the shipping container 102 distally therefrom so as to support the distal ends 114 of the end truss members 118. The uprights 104 may be connected or firmly fixed to the ground using ground stakes or the like or may optionally be supported by a foot or ground plate as are commonly. The uprights 104 are further bolted, pin or otherwise fastened to the distal ends 114 of the end truss members 118 according to known methods. The uprights 104 may further be formed of a solid member, such as a post or the like or may optionally be formed as a space frame member as illustrated in FIG. 1.

Figure 5:
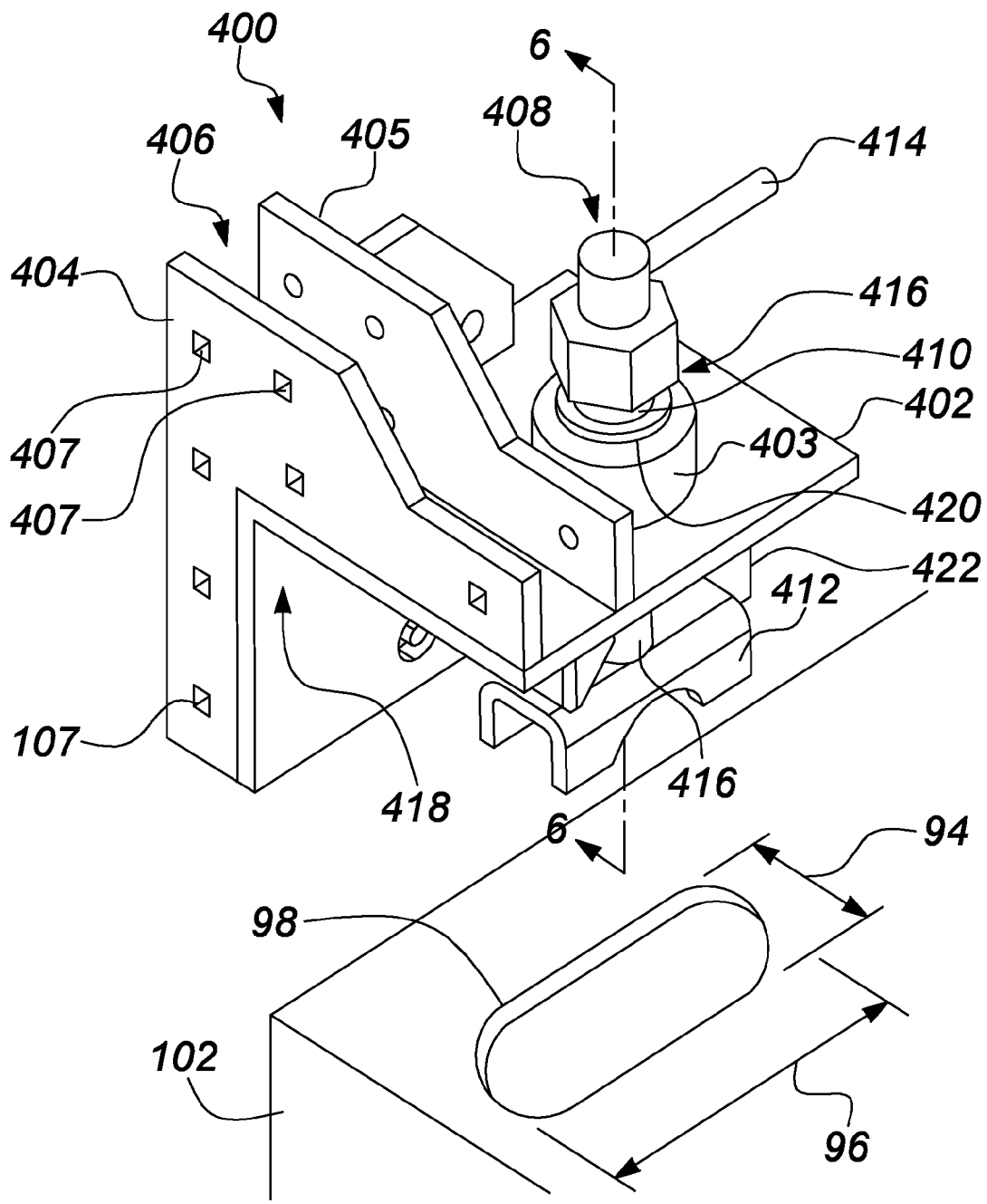
FIG. 5 is a perspective view of a coupling unit for connection to a container according to a further embodiment of the present invention.
Figure 6:
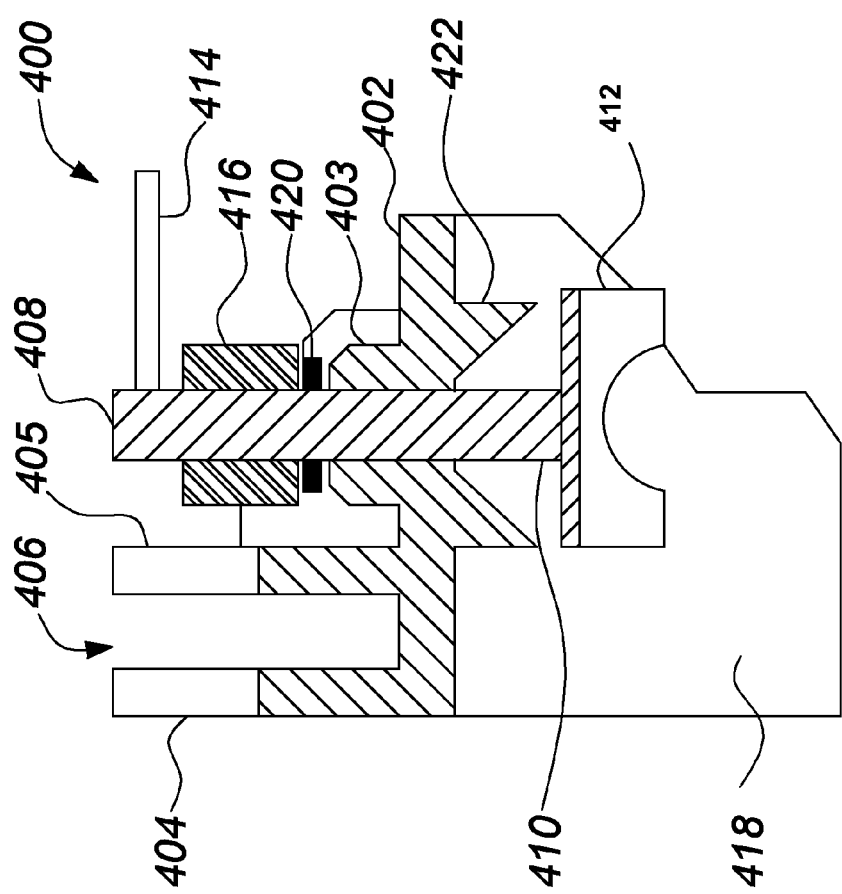
FIG. 6 is a cross-sectional view of the coupling unit of FIG. 6 as taken along the line 6-6.
Figure 7A:
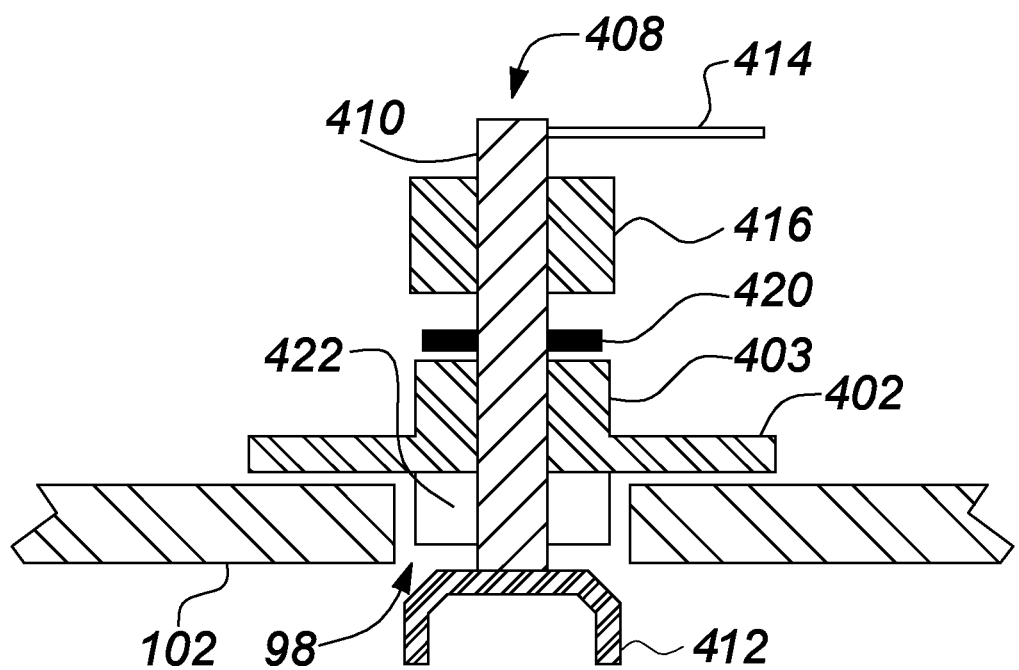
FIG. 7A is a cross-sectional view of the coupling unit of FIG. 6 as taken along the line 7-7 at a disengaged orientation.
Figure 7B:
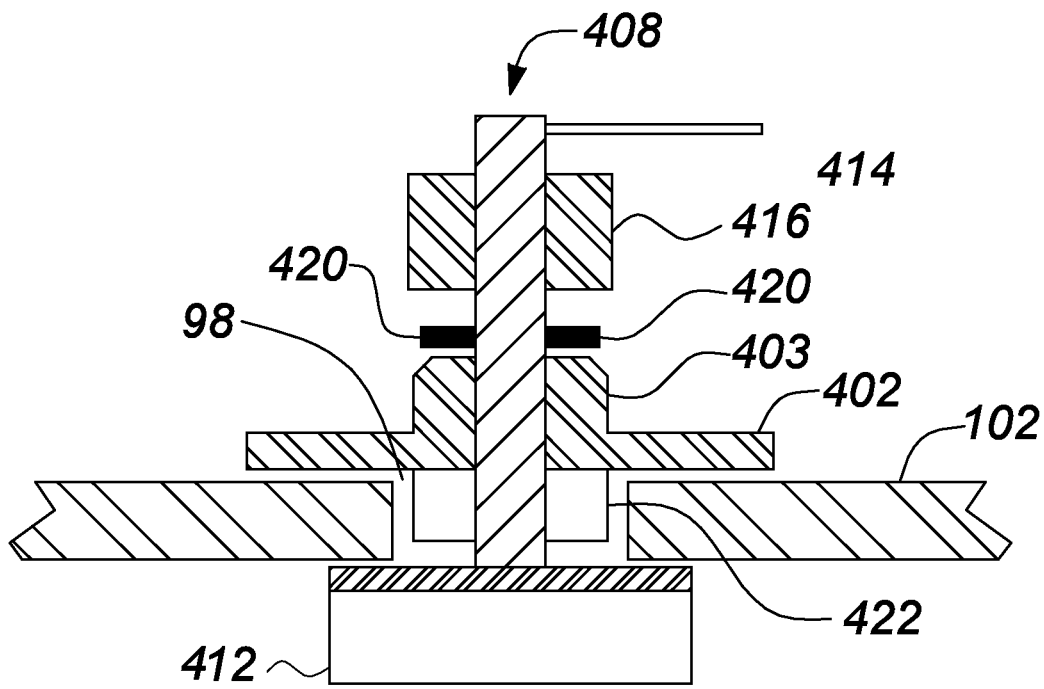
FIG. 7B is a cross-sectional view of the coupling unit of FIG. 6 as taken along the line 7-7 at an engaged orientation.

Turning now to FIGS. 5 and 6, a coupling unit 400 for securing one of the top trusses to a shipping container comprises of a base plate 402 and a first and second bracket plates, 404 and 405, respectively extending substantially perpendicularly therefrom. The first and second bracket plates form a cavity 406 therebetween sized to receive a structural member, such as, by way of non-limiting example, a center truss member 120 or side wall 130. The first and second bracket plates 404 and 405 are provided with a plurality of apertures 407 extending therethrough to fasten the coupling units 400 located between the first and second bracket plates 404 and 405 by the use of bolts, pins or other suitable fasteners. The coupling unit 400 also has a locking member 408 configured to engage with a lock receiver 98 as are commonly known on an exterior surface of the shipping container 102. As illustrated in FIG. 5, the lock receiver 98 may commonly be oval shaped with long and short directions 96 and 94, respectively such as is commonly known as a corner casting for an intermodal container. The locking member 408 comprises an elongate screw member 410 extending between top and bottom ends, the screw member is threadably passed through the base plate 402. Optionally, the base plate may include a threaded raised collar 403 surrounding the screw member 410. The locking member 408 also has locking block 412 fixedly connected to the bottom end of the screw member 410. The locking block 412 has a size selected to be passed through the lock receiver 98 in a first or disengaged orientation as illustrated in FIG. 7A and retained therein when rotated 90 degrees to a locked orientation as illustrated in FIG. 7B. The locking block will have a size selected to have a length greater than the short direction 94 and less than the long direction 96 of the lock receiver 98 and a with less than the short direction 94 of the lock receiver 98. By way of non-limiting example, it has been found that a width of up to 2 inches (51 mm) and a length of between 2.5 and 4 inches (64 and 102 mm) although it will be appreciated that these dimensions may be varied depending upon the lock receiver size used.

Figure 8:
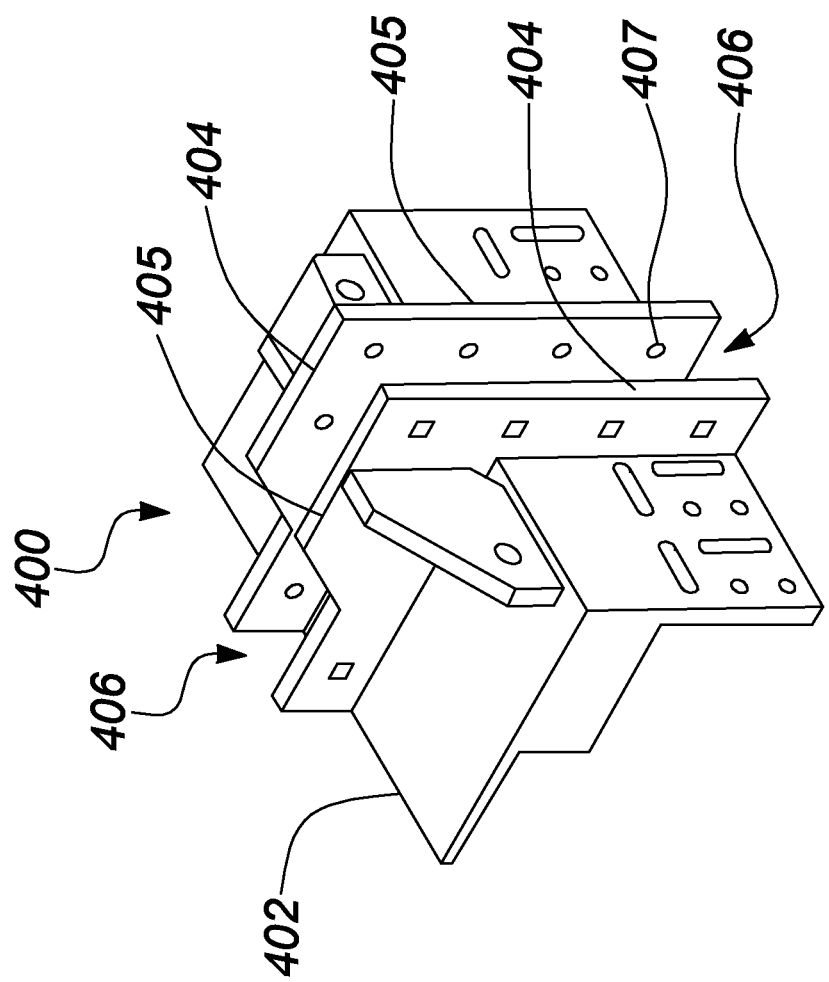
FIG. 8 is a perspective view of a coupling unit for location along a side of the shipping container according to a further embodiment of the present invention.
Figure 9:
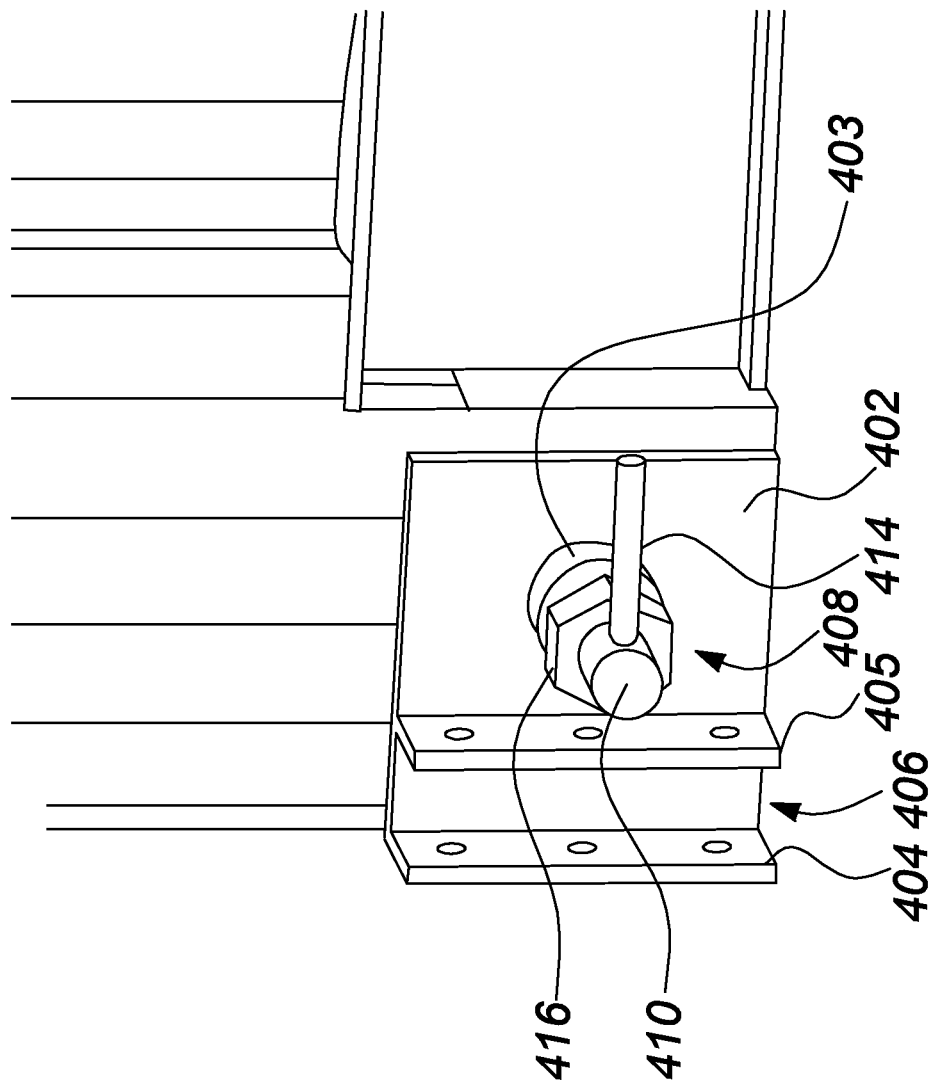
FIG. 9 is a perspective view of a coupling unit located along a bottom corner of the shipping container according to a further embodiment of the present invention.

The locking member 408 also includes a handle 414 protruding from the top end of the screw member 410. The handle 414 is capable of being rotated by a user to turn the screw member 410 and the locking block 412 into the engaged and disengaged position. The locking member 408 also has at least one nut 416 threadably located around the screw member 410 between the handle 414 and the base plate 402 being operable to rotatable lock the screw member 410 and may optionally include a lock washer 420 as are commonly known between the nut 416 and the base plate 402. As illustrated in FIG. 5, the coupling unit 400 may have a L-shaped profile formed by a side plate 418 extending from the base plate 402 so as to position the coupling unit 400 at an edge of the shipping container 102. As illustrated in FIG. 5, the coupling unit 400 may be adapted to be located in one of the top corners of the shipping container 102, however the coupling unit 400 may also be adapted to be located at a top middle portion of the shipping container as illustrated in FIG. 8, or a bottom corner of the shipping container as illustrated in FIG. 9.

With reference to FIGS. 7A and 7B, the locking block 412 may be passed through a lock receiver 98 in a shipping container with the locking block 412 in the disengaged orientation as illustrated in FIG. 7B. As illustrated the coupling unit 400 may optionally include raised guides 422 extending from the bottom surface of the base plate 402 which are sized to closely center the locking member 408 within the lock receiver. Once the locking block 412 is located within the lock receiver 98, the handle 414 may be turned by a user so as to rotate the locking block 412 approximately 90 degrees to the engaged position as illustrated in FIG. 7B. In such an orientation, the length of the locking block 412 will extend across the short direction of the lock receiver 98 thereby retaining the locking block 412 therein. Thereafter, the nut 416 may be turned in a downward direction to engage either directly upon the base plate 402 or to engage the lock washer 420 therebetween and thereby to fix the rotation of the screw member 410 from further rotation.

Figure 10:
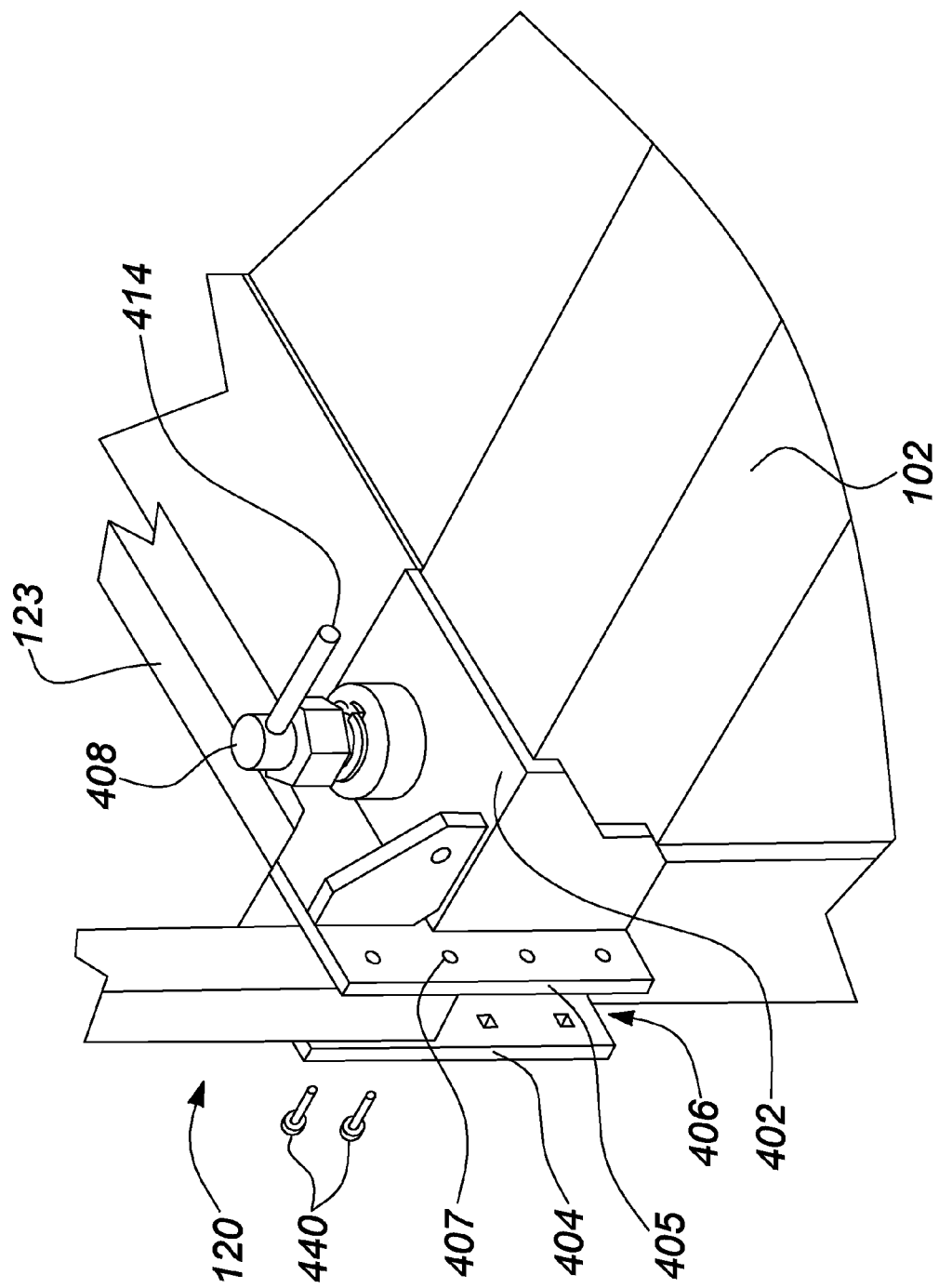
FIG. 10 is a perspective view of a coupling unit located along a top corner of a shipping container with a truss located thereon and supported thereby.

With reference to FIG. 10, in order to set up the system 100, the coupling units 400 are secured within the lock receivers 98 as set out above with the first and second bracket plates 404 and 405 aligned with each other on opposed sides of the shipping container. Thereafter, the top trusses 120 may be located with the bottom member 123 between the first and second bracket plates 404 and 405 within the cavity 406 and secured thereto with fasteners 440 passed through the fastener bores 127 in the bottom member and the apertures 407 in the first and second bracket plates.

Figure 11:
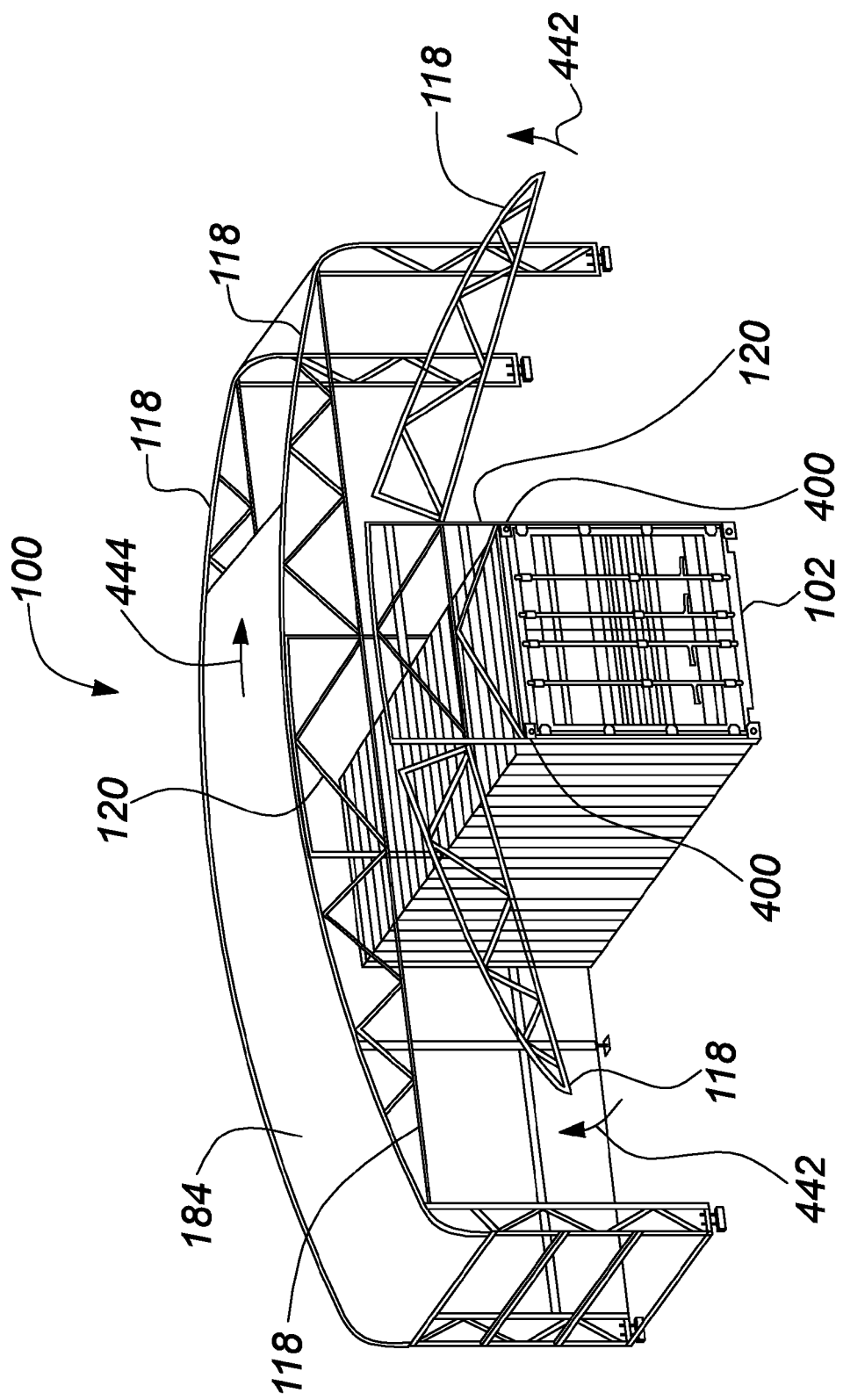
FIG. 11 is a perspective view of the system of FIG. 1 at an intermediate stage of assembly.

With reference to FIG. 11, each center truss member 120 may thereafter have the end trusses connected thereto by locating the bottom member 109 of the end truss between the middle bracket plates 150 and thereafter passing a fastener 154 through the bores 152 in the middle bracket plates 150 and the bore 156 in the end brackets as illustrated in FIG. 3. Thereafter end truss members 118 may be rotated in an upward direction, generally indicated at 442 and the top member 107 of the end truss member 118 secured between the top bracket plates 140 in a similar manner. Thereafter, the uprights 104 may be secured under the distal ends 114 of the end truss member 118 by any commonly known method, such as fasteners or the like. The roof to the structure is provide by drawing the fabric sheet 184 in a direction generally indicated at 444 with the bead edges 182 located within the channels 178. Furthermore, side walls 130 may be secured under the trusses 106 and to coupling units 400 on the shipping container in a similar fashion as illustrated in FIG. 1. It will also be appreciated that side walls may be applied between the uprights 104 to end close the structure according to known methods.

The system 100 provides additional space around the shipping container 102 depending up on the size of the trusses being used. These additional spaces may be used for storing other objects in addition to the shipping container 102. Using multiple frame structures a huge building for storing multiple containers may also be created.

While specific embodiments of the invention have been described and illustrated, such embodiments should be considered illustrative of the invention only and not as limiting the invention as construed in accordance with the accompanying claims.

What is claimed is:

1. A system for forming a structure around a shipping container, the system comprising a plurality of uprights positioned on a ground at a distance from a side of said shipping container;
   a plurality of trusses, each of said plurality of trusses having top and bottom members extending between proximate and distal ends, said proximate end of each of said top and bottom members having a bore therethrough engageable by a pin connection supported by said shipping container, said distal ends of said top and bottom members being engageable with and supported by one of said uprights; and
   at least one upper covering member connected to said plurality of trusses to form an upper covering for said shipping container, said at least one upper covering member including at least one flexible elongate bead extending therealong slidably receivable within a track formed in said top members of said trusses; and
   a plurality of covering frames positioned proximal to an end boundary of the shipping container, wherein each of said plurality of covering frames is coupled to a distal end of said uprights; and
   a plurality of side covering members connected to said plurality of covering frames to form a side covering;
   wherein said at least one upper covering member is slidably supported by said top members of said trusses;
   said upper covering member includes at least one flexible elongate bead extending therealong receivable within a track formed in said top members of said plurality of trusses.

2. The system of claim 1 further comprising a top truss securable to a top of said shipping container, said top truss having a top member with a track therethrough.

3. The system of claim 2 wherein said top truss includes top and bottom brackets at opposed sides thereof operable to hingedly support said bores of one of said plurality of trusses.

4. The system of claim 3 wherein said brackets comprise a pair of plates, wherein said pair of plates are spaced apart by a distance corresponding to a width of said truss and wherein said each of said pair of plates has a bore therethrough corresponding to said bore of said truss.

5. The system of claim 2 wherein said tracks formed in said to members of said plurality of trusses and said track of said to truss form a continuous track to pass a common elongate bead of a upper covering member therethrough.

6. The system of claim 2, further comprising a plurality of coupling units for coupling said top truss to at least one top end of said shipping container.

7. The system of claim 6 wherein each of said plurality of coupling units comprises:
   a base plate;
   a plurality of flanges extending outwardly from said base plate to form at least one locking track, wherein said at least one locking track is capable of receiving said top truss; and
   at least one locking member configured to engage with a lock receiver on an exterior surface of said shipping container.

8. The system of claim 7 wherein said locking member comprises:
   an elongate screw member extending between top and bottom ends, said screw member being threadably passed through said base plate;

a locking block fixedly connected to said bottom end of said screw member, said locking block being engageable within said lock receiver and selectably rotatable between engaged and disengaged positions therein;

a handle protruding from said top end of said screw member, wherein said handle is capable of being rotated to turn said screw member and said locking block into said engaged and disengaged positions; and at least one nut member threadably located around said screw member between said handle and said base plate being operable to rotatable lock said screw member.

9. The system of claim 7 wherein said base plate has an L-shaped cross-section.

\* \* \* \* \*